Figure 1:
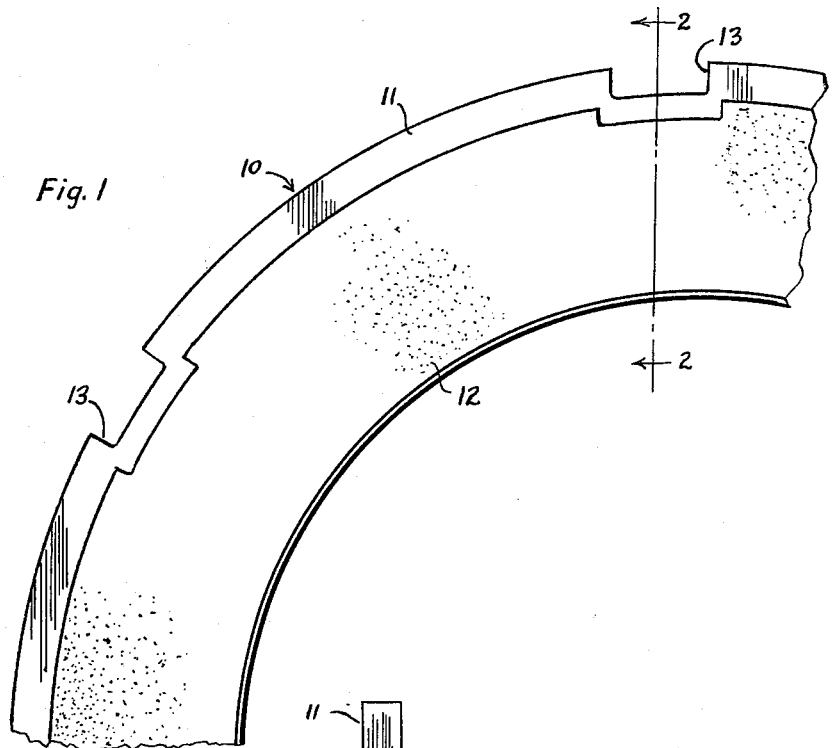

INVENTORS
FRED E. KENDALL
& ROBERT L. SHAW
BY Richard H. MacCutcheon
ATTORNEY

United States Patent Office 3,191,278
Patented June 29, 1965

3,191,278
FRICTION COMPOSITION
Fred E. Kendall, Pepper Pike, and Robert L. Shaw, Northfield, Ohio, assignors, by mesne assignments, to American Brake Shoe Company, New York, N.Y., a corporation of Delaware
Filed Oct. 21, 1963, Ser. No. 317,695
9 Claims. (Cl. 29—182.5)

Our invention relates to improvement in friction material for heavy duty clutches and brakes, for example for brakes for controlling rotational movement and dissipating a large amount of heat energy in a short period of time, as required in the case of landing wheel brakes for aircraft of large size. For such use there are severe restrictions of space and weight in addition to the basic requirement of large heat load capacity.

Heretofore, friction mixes have been found acceptable for such use in most instances insofar as coefficient of friction, smoothness (as hereinafter defined in connection with torque peak ratio characteristics), freedom from grabbing (chatter), and other factors are concerned. For such applications the art is increasingly turning to copper base "mixes" and a difficulty has arisen in that the "core," a solid metal member on which the friction material is supported, has failed due to cracking, or the "opposing surface," which the friction material engages during operation, has failed due to cracking. In either event such cracking ultimately leads to parting and complete failure of the apparatus.

It is an object of our invention to provide simple and inexpensive means for overcoming the above mentioned difficulties.

Another object is to provide an improved friction lining material capable of satisfying the maximum number of requirements particularly under the most severe working conditions.

As conducive to a better understanding of certain features of our invention, it may be noted that the role of powder metallurgy in the production of sintered friction facing materials is old and well known. Generally the process consists of (1) preparing a mix containing predetermined amounts of metallic and non-metallic powders; (2) compressing the powdered mixture to form a briquette; and (3) heating the briquette at the sintering temperature of the predominant metallic powder which is thereby formed into a porous matrix or network throughout which the other ingredients are dispersed. Because the initial briquette or compact of originally powdered materials, even when sintered, is rather porous and of low tensile strength, it is customary to provide a reinforcing backing plate of steel, or of steel copper-plated in order to provide a good bond. Conventionally the heat and pressure of the sintering step is used both to cause the pressed powder to sinter and to integrally bond it to the backing plate. When friction material is to be placed on both sides of a "backing," it is more conventional to refer to the solid metal as the "core."

Usually when copper is used as the predominant metallic powder, it has been customary to include other metals usually tin, lead and iron as well as non-metallic powders such as silica and graphite. Typical in this respect is a mixture of 67 Cu, 5 Sn, 1.5 Pb, 9.5 Fe, 4 $MoS_2$, 3.5 $SiO_2$, and 9.5 graphite, all by weight.

In such a typical mix, copper may have been used as the basic metal because of its heat conducting properties. Tin was included with the thought that it functioned as a bronze-producing substance to add strength to the metallic matrix or network by substantially alloying with the copper during sintering, while the rest of the materials were used as friction modifying agents. The term "friction modifying material" as used herein includes both "friction producing agents" and "lubricating agents." Friction producing agents, which normally add to the coefficient of friction when used in a mix, include silica, silicon carbide, white cast iron grit, alumina, mullite, molybdenum disilicide, iron and other known materials. Lubricating agents, which normally lower the coefficient of friction when used in a mix of the type described, include molybdenum disulfide, lead, and graphite, as is well known. Thus iron may be used to give the finished material a higher coefficient of friction; and lead, a metallic lubricant, to prevent jerking or grabbing in operation. Silica is conventionally included for its abrasive, friction-producing qualities, and molybdenum disulfide and graphite are used as lubricants to provide a smooth rubbing action and reduced wear.

Broadly, our invention is based on our discovery that core and/or opposing surface cracking is probably due to tin migration at the grain boundaries where it leaves the friction material and enters the core (usually ferrous) and/or the opposing metal (usually ferrous). Also on our further discovery that the above objects can be met and an improved mix provided when titanium, or a related metal, is substituted for the tin. We have found that such replacement has the advantages of causing minimal change in performance, requiring no change in fabrication procedures, and obviating cracking of mating members without increasing weight of the equipment (as would be the case if core and opposing surface were merely made thicker or otherwise strengthened so that tin could be used in the mix as before).

Figure 2:
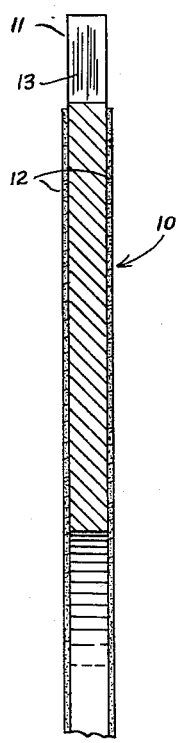

Other objects and advantages of our invention will become apparent and the invention may be better understood from consideration of the following description and the accompanying drawing in which:

FIG. 1 is a fragmentary axial section of a rotary composite friction disc for an aircraft brake; and FIG. 2 is a radial sectional view taken along the line 2—2 of FIG. 1.

Referring now more particularly to the practice of our invention, a disc indicated generally at 10 in FIGS. 1 and 2 which may be either stationary or rotatable but which for purposes of description will be assumed rotatable for cooperation with non-rotating opposing surface discs (not shown). In well known manner there usually are a plurality of annular discs anchored alternately to rotatable and non-rotatable structure, with means for pressing the discs axially together to frictionally resist turning of the rotational structure. Each disc 10 has a solid metal core 11 usually of steel. Friction composition facings 12 are sinter bonded one on each axial side of the core. At its outer edge, the core 11 is shown provided with equally spaced notches 13 for engagement with lugs associated with a rotatable wheel member (not shown).

We have found that a greatly improved friction composition product, particularly for high energy clutch or aircraft brake use, is achieved by using a pressed and sintered mix comprising a matrix or base of copper originally finely divided with other powdered materials including titanium as set forth below. A preferred composition (the percentages of the ingredients being by weight) is:

| | Percent |
|---|---|
| Titanium | 5.0 |
| Lead | 1.5 |
| Iron | 9.5 |
| $MoS_2$ | 4.0 |
| $SiO_2$ | 3.5 |
| Graphite | 9.5 |
| Copper | Balance |

Nature knows few critical limits and it is almost impossible to set actual limits for desirable ranges for the above proportions since, as will be appreciated, precise limits depend upon so many factors, for example, nature, particle size and even shape of each of the ingredients, density of each of the ingredients, pressures used during compounding, sintering temperatures, ultimate application of the end product particularly with respect to engagement pressure, cooling if any, shape and composition of mating surface, size and shape of the friction material, and other factors. However, for high energy aircraft brake applications the following ranges are suitable:

50–80 Cu
0–10 Pb
0–20 Fe
0–6 $MoS_2$
0–5 $SiO_2$
5–15 graphite
2–10 titanium

As far as processing data is concerned, the powders may be briquetted in a press at a pressure on the order of 11.5 tons per sq. in., then while in a non-oxidizing atmosphere and while under a pressure of 200 lbs. per sq. in. heated to a temperature of 1550° F. with a half hour soak at pressure once this temperature is reached.

It was certainly not immediately apparent that titanium would be operative or desirable in such a combination, for titanium has the characteristic of softening with temperature rise, is expensive, and is flammable, for example, for example during grinding.

We have found, however, as shown in part by the results reported in the table set out below, that titanium, and equivalent metals, provide advantages hereinabove and hereinafter mentioned. A predominant advantage is probably due to their molecular diffusion with the copper, preventing the catastrophic wear which would result if neither tin nor a substitute for it were present. In any event the titanium, or its equivalent, eliminates or reduces cracking of core and/or of opposing surface material.

In the table, a base for comparison is established from tests using a "best prior art" mix of 5% Sn, 1.5% Pb, 9.5% Fe, 4% $MoS_2$, 3.5% $SiO_2$, 9.5% C, and 67.0% Cu, with the results being as shown by the first horizontal line of the table (results for Test No. 216). For the mixes indicated by the other horizontal lines (Test Nos. 644, 611, 590, etc.), the formulation is exactly the same execpt other material, as indicated in Col. 2, is substituted for the tin. In each case the procedures followed are as nearly identical as possible, the tests being made on an inertial dynamometer comprising a fixture having a rotating disc with friction material under test on both sides thereof arranged to mate with stationary opposing discs of "Timken" 17–22A(s) steel.

As is customary in the art, braking action is brought about by the forcing of the discs together. The tests are run with a constant energy input, a flywheel being brought to a complete stop with each brake application. The brake fixture is held on a torque shaft which operates a torque arm against the restraint of an oil filled bellows. Electrical apparatus is used to apply the brake at desired pre-set speeds and to release the brake when the flywheel has come to rest. Pressure recorders record brake hydraulic pressure used for each stop and supply torque curves for each stop, and a Sanborn recording oscillograph is used to record deflection of a chatter torque arm. Coefficient of friction is calculated as torque at unit radius divided by total brake pressure.

In conducting the tests on the various brake compositions, the same number of fifty stops is used for each test, except in cases where the tests could not be completed as noted in column 10, for example because the material completely wore away or one of the cooperating members showed signs of falling apart.

Column 3 shows wear (in mils per face per stop) as determined from difference in micrometer readings before and after test.

Column 4 of the table shows the torque peak ratio, where:

Torque peak ratio = $\dfrac{\text{peak torque}}{\text{average torque for one stop}}$ Column 5 shows maximum average coefficient of friction (per stop), and column 6 shows minimum average coefficient of friction (per stop) over 50 stops (if 50 could be completed without some disability), and column 7 shows the difference of these two values as coefficient "Decay." Those in the art will recognize that "Decay" (which is the difference of max. and min. for many stops) is not the same as "Fade" (which is the decrease of coefficient of friction from beginning to just before the end of one stop) but a change in the one may be reflected in a change in the other.

*Table*

| 1 | 2 | 3 | 4 | 5 | 6 | 7 | 8 | 9 | 10 |
|---|---|---|---|---|---|---|---|---|---|
| Test No. | Sn or substitute | Wear | Tq. Pk. ratio | Coef. max. | Coef. min. | Coef. decay | Coef. av. dynamic | Av. chatter | Number of stops |
| 216 | Sn | .592 | 1.10:1 | .260 | .200 | .060 | .229 | 161 | 20 |
| 644 | Ti | .377 | 1.37:1 | .280 | .220 | .060 | .259 | 145 | 50 |
| 611 | Si | .513 | 1.31:1 | .440 | .290 | .150 | .348 | 229 | 50 |
| 590 | As | .477 | 1.28:1 | .275 | .170 | .105 | .234 | 167 | 50 |
| 583 | Zn | 1.530 | 1.00:1 | .235 | .170 | .065 | .205 | 148 | 15 |
| 548 | S | 1.258 | 1.21:1 | .215 | .160 | .055 | .187 | 112 | 22 |
| 30 | Ni | 1.775 | 1.80:1 | .245 | .150 | .095 | .430 | 250 | 20 |
| 12 | Bi | .493 | 1.00:1 | .265 | .150 | .115 | .210 | 265 | 36 |
| 13 | Cd | 1.34 | 0.90:1 | .270 | .170 | .100 | .218 | 295 | 20 |
| 1 | Sb | .850 | 0.90:1 | .270 | .210 | .060 | .248 | 265 | 10 |
| 4 | Pb | .616 | 1.00:1 | .230 | .130 | .100 | .197 | 240 | 44 |
| 649 | Mo | 7.92 | 1.70:1 | .255 | .170 | .085 | .200 | 138 | 10 |
| 661 | V | .300 | 1.90:1 | .295 | .160 | .135 | .200 | 465 | 50 |

Column 9 shows chatter, which was obtained from the recording oscillograph.

Column 8 shows the average dynamic coefficient of friction, and for the vertical columns 8 and 9, the values represent an average (for many stops of averages one for each stop).

Horizontal line numbered "216" (Test No. 216) shows that for the base for comparison (copper base mix with tin) only 20 stops could be completed. This was due to opposing face and core cracking; and it is an object of the present invention to improve upon this failure.

By contrast, in the table, the second horizontal line (Test No. 644) shows results for the preferred embodiment which uses titanium. Here the wear is substantially decreased; torque peak ratio is acceptable; the coefficient of friction properties are good; chatter is lessened; and there is no observable cracking.

The table shows other metals which were used. As used herein, by the word "metal" we mean to include the alloy forming element silicon. From the table, it appears that any metal, of the Fifth Period and above in Groups IV and V of the Periodic Table (silicon, titanium, germanium for Group IV and vanadium and arsenic for Group V), is operative even though present day relative expense and handling problems associated with germanium might dictate its non-use as a practical matter. The data presented in the page 7 table shows that although titanium may be slightly preferable as far as various properties are concerned, silicon and arsenic are acceptable. Vanadium is also acceptable. Zinc, sulfur, nickel, cadmium and molybdenum led to unacceptable high wear and/or core failure or opposing face cracking. Antimony, bismuth and lead provided insufficient improvement over tin as far as cracking is concerned. Other materials were tested but in each such case ample reason existed for rejecting them in favor of one of the Period 3 and 4, Group IV and V uncombined metals (silicon, titanium and vanadium).

There is thus provided a composition of the character described capable of meeting the objects above set forth, and obviating or minimizing deleterious cracking of backing material or opposing metal. While we have illustrated and described particular embodiments, various modifications may obviously be made without departing from the true spirit and scope of the invention which is intended to be defined only by the accompanying claims taken with all reasonable equivalents.

We claim:

1. Heavy duty brake, clutch and like product, comprising a friction facing composition, solid support for said facing composition and a solid opposing surface for the facing, at least one of which said support and opposing surface is of ferrous metal, which products are characterized by being substantially free of cracking of support and of opposing surface, said friction facing composition being substantially free of tin and essentially consisting of a sintered mixture of copper in major amount; ingredient of the group consisting of silicon, titanium, vanadium, and arsenic in minor amount; and friction modifying agent therefor.

2. Heavy duty brake, clutch and like product, comprising a friction facing composition, solid ferrous support for said facing composition and solid ferrous opposing surface for the facing, which products are characterized by being substantially free of cracking of support and of opposing surface, said friction facing composition being substantially free of tin and essentially consisting of a sintered mixture of 50% to 80% copper; 2% to 10% ingredient of the group consisting of silicon, titanium, vanadium and arsenic; and 10% to 48% friction modifying material, all by weight.

3. A friction member for brake, clutch and the like comprising a friction composition and a backing member therefor for use with accompanying opposing surface member, at least one of which backing and opposing member is composed of ferrous metal and which friction member is characterized by low wear, favorable friction properties and minimal embrittlement of such ferrous member, said friction composition being substantially free of tin and essentially consisting of a pressed and sintered mixture of copper powder in major amount; powder ingredient of the group consisting of silicon, titanium, vanadium and arsenic in minor amount; and friction modifying material.

4. A friction member for brake, clutch and the like comprising a friction composition and a backing therefor for use with accompanying opposing surface member, at least one of which backing and opposing member comprises ferrous metal, which friction member is characterized by low wear, favorable friction properties and minimal embrittlement of such ferrous backing or opposing member, said friction composition being substantially free of tin and essentially consisting of a pressed and sintered mixture of at least 50 percent copper powder and at least 2 percent of powder ingredient selected from the group consisting of silicon, titanium, vanadium, and arsenic.

5. A friction member for brake, clutch and the like comprising a friction composition and a backing therefor for use with accompanying opposing surface member, at least one of which backing and opposing member comprises ferrous metal, which member is characterized by low wear, favorable friction properties and minimal embrittlement of such ferrous backing or opposing member, said friction composition essentially consisting of a pressed and sintered mixture of about 50% to 80% copper powder, about 2% to 10% titanium powder, about 5% to 15% graphite, 0% to 10% lead, 0% to 20% iron, 0% to 6% molybdenum disulphide, and 0% to 5% silica.

6. A sintered friction composition product for use with ferrous metal, said composition being substantially free of tin and essentially consisting of a sintered mixture of at least about 50% copper powder; at least about 2% powder ingredient of the group consisting of silicon, titanium, vanadium and arsenic dispersed throughout the copper; and at least about 5% friction modifying material.

7. A friction composition product being substantially free of tin and essentially consisting of a sinter of about 50% to 80% copper powder by weight; about 2% to 10% powder ingredient of the group consisting of silicon, titanium, vanadium and arsenic dispersed throughout the copper; and about 10% to 48% friction modifying material.

8. A friction composition product being substantially free of tin and essentially consisting of about 50% to 80% copper, about 2% to 10% titanium, about 5% to 15% graphite, 0% to 10% lead, 0% to 20% iron, 0% to 6% molybdenum disulphide, and 0% to 5% silica.

9. A friction composition product being substantially free of tin and essentially consisting of about 5.0% titanium, about 1.5% lead, about 9.5% iron, about 4.0% molybdenum disulphide, about 3.5% silica, about 9.5% graphite, and remainder substantially all copper.

References Cited by the Examiner

UNITED STATES PATENTS

| | | | |
|---|---|---|---|
| 2,393,906 | 1/46 | Hensel et al. | 29—182 |
| 2,512,455 | 6/50 | Alexander | 75—164 |
| 2,783,143 | 2/57 | Johnson et al. | 75—164 |
| 3,019,514 | 2/62 | Bickelhaupt et al. | 29—182.5 |
| 3,021,592 | 2/62 | Herron et al. | 75—201 |
| 3,114,197 | 12/63 | Du Bois | 75—201 |

CARL D. QUARFORTH, *Primary Examiner.*

REUBEN EPSTEIN, *Examiner.*